United States Patent
Creamer et al.

(10) Patent No.: US 8,312,466 B2
(45) Date of Patent: *Nov. 13, 2012

(54) RESTRICTING RESOURCES CONSUMED BY GHOST AGENTS

(75) Inventors: Thomas Creamer, Boca Raton, FL (US); Bill H. Hilf, La Habra, CA (US); Peeyush Jaiswal, Boca Raton, FL (US); Neil Katz, Parkland, FL (US); Michael Mirt, Deerfield Beach, FL (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 954 days.

This patent is subject to a terminal disclaimer.

(21) Appl. No.: 12/326,642

(22) Filed: Dec. 2, 2008

(65) Prior Publication Data

US 2009/0083749 A1    Mar. 26, 2009

Related U.S. Application Data

(63) Continuation of application No. 10/666,464, filed on Sep. 19, 2003, now Pat. No. 7,480,914.

(51) Int. Cl.
*G06F 9/46* (2006.01)
*G06F 15/173* (2006.01)
(52) U.S. Cl. ......... 718/105; 718/104; 709/224; 709/226
(58) Field of Classification Search ........................ None
See application file for complete search history.

(56) References Cited

U.S. PATENT DOCUMENTS

| | | | |
|---|---|---|---|
| 5,638,494 A | 6/1997 | Pinard et al. | |
| 5,655,081 A | 8/1997 | Bonnell et al. | |
| 5,812,780 A | 9/1998 | Chen et al. | |
| 5,913,040 A * | 6/1999 | Rakavy et al. | 709/232 |
| 5,958,010 A | 9/1999 | Agarwal et al. | |
| 6,012,152 A | 1/2000 | Douik et al. | |
| 6,083,281 A | 7/2000 | Diec et al. | |
| 6,105,059 A | 8/2000 | Al-Karmi et al. | |
| 6,115,393 A | 9/2000 | Engel et al. | |
| 6,122,664 A | 9/2000 | Boukobza et al. | |
| 6,266,805 B1 | 7/2001 | Nwana et al. | |
| 6,397,359 B1 | 5/2002 | Chandra et al. | |
| 6,427,000 B1 | 7/2002 | Mumford et al. | |
| 6,430,707 B1 | 8/2002 | Matthews et al. | |
| 6,496,871 B1 | 12/2002 | Jagannathan et al. | |
| 6,671,724 B1 | 12/2003 | Pandya et al. | |

(Continued)

OTHER PUBLICATIONS

Paolo Bellavista; How to monitor and control resource usage in mobile agent systems; 2001, IEEE, pp. 65-75.*

(Continued)

*Primary Examiner* — Jennifer To
*Assistant Examiner* — Abdullah Al Kawsar
(74) *Attorney, Agent, or Firm* — Novak Druce + Quigg LLP

(57) ABSTRACT

One aspect of the present invention can include a method for restricting resources consumed by ghost agents. The method can include the step of associating a ghost agent with a host. A resource utilization value can be ascertained for the ghost agent and the host combined. The ascertained resource utilization value can be compared with a usage threshold. A determination can be made as to whether operations of the ghost agent are to be executed based upon the previous comparison.

11 Claims, 4 Drawing Sheets

U.S. PATENT DOCUMENTS

| | | | |
|---|---|---|---|
| 6,681,243 | B1 | 1/2004 | Putzolu et al. |
| 6,904,593 | B1 * | 6/2005 | Fong et al. .................... 717/171 |
| 7,222,345 | B2 | 5/2007 | Gray et al. |
| 7,313,129 | B1 * | 12/2007 | Bova et al. .................... 370/352 |
| 7,614,059 | B2 * | 11/2009 | Manzano .................... 719/315 |
| 7,747,730 | B1 * | 6/2010 | Harlow ........................ 709/224 |
| 2002/0162053 | A1 | 10/2002 | Os |
| 2002/0174415 | A1 | 11/2002 | Hines |
| 2003/0014691 | A1 | 1/2003 | Abdelilah et al. |
| 2003/0028858 | A1 | 2/2003 | Hines |
| 2005/0058099 | A1 | 3/2005 | Hernandez-Mondragon et al. |
| 2005/0160423 | A1 | 7/2005 | Bantz et al. |
| 2008/0091825 | A1 | 4/2008 | Mannava et al. |

OTHER PUBLICATIONS

Chuang Liu, et al., "Design and Evaluation of a Resource Selection Framework for Grid Applications; High Performance Distributed Computing", 2002, HPDC-11, 2002. Proceedings 11th IEEE International Symposium.

Fox, et al., "Cluster-Based Scalable Network Services", ACM Digital Library, pp. 78-91, Oct. 1997.

Wilson, et al., "Mobile Agents for Distribution Simulation", 1999 Advances Simulation Technologies Conference, pp. 53-58, 1999.

Kalpolka, et al., "A Unified Component Framework for Dynamically Extensible Virtual Environments", CVE '02, pp. 64-71, Sep. 30-Oct. 2, 2002.

Martin, et al., "The Privacy Practices of Web Browser Extensions", Communications of the ACM, vol. 44, No. 2, pp. 45-50, Feb. 2001.

Satish S. Vadhiyar, "A Performance Oriented Migration Framework for the Grid", ACM International Symposium; May 12-15, 2003.

Munehiro Fukuda, "A Mobile-Agent Based PC Grid", Autonomic Computing Workshop, Jun. 25, 2003, IEEE.

* cited by examiner

RESTRICTING RESOURCES CONSUMED BY GHOST AGENTS

CROSS REFERENCE TO RELATED APPLICATIONS

This application is a continuation of, and accordingly claims the benefit from, U.S. patent application Ser. No. 10/666,464, filed Sep. 19, 2003 now issued U.S. Pat. No. 7,480,914, which was issued from the U.S. Patent and Trademark Office on Jan. 20, 2009.

BACKGROUND

1. Field of the Invention

The present invention relates to the field of computer science and, more particularly to restricting resources consumed by ghost agents within a grid environment.

2. Description of the Related Art

A grid environment is a distributed computing environment where computing, application, storage, and/or network resources can be shared across geographically disperse organizations. An ideal grid environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a maimer similar to the commercial consumption of electricity and water.

While grid computing may presently be at an early stage in its evolution, several grid environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid environment, such as Avaki's data grid from Avaki of Burlington, Me. and Grid MP Enterprise from United Devices of Austin, Tex. Further, a number of readily available toolkits and standards have been developed for creating a grid environment including, for example, the Globus Toolkit provided by the Globus project and the Open Grid Services Architecture (OGSA).

A grid environment can include multiple applications. Each application can include a set of computing resources that performs a series of related tasks. Examples of applications include, but are not limited to, word processors, database programs, Web browsers, development tools, drawing applications, image editing programs, and communication programs. The various computing resources for one application can be distributed across several different grids within a grid environment, wherein each grid can contain a myriad of diverse hardware components, such as communication lines, networking routers, servers, workstations, peripherals, intranets, and the like.

The interdependencies that exist among applications and hardware resources in a grid environment can make it difficult for providers of grid-based applications to perform testing, installation, monitoring, and maintenance tasks. One such difficulty relates to induced environmental interferences. That is, methods for performing the above listed tasks can consume significant computing resources of the grid environment, which can be referred to as overhead. The overhead can affect operational characteristics of the grid environment. Consequently, results from the listed tasks can be compromised by the overhead resulting from task execution. If the amount of resources used in performing the listed tasks can be constrained, however, the disruptions induced by the tasks can be minimized.

Conventional methods for controlling the privileges granted to system resources include such methodologies as Java's sand box model by Sun Microsystems of Palo Alto, Calif., Free BSD's "jail" function by the FreeBSD Foundation, and Linux's chroot "jail" function. None of these methodologies, however, can provide resource consumption controls flexible enough to be generically utilized within a grid environment. Consequently, a new methodology is required that reduces undesirable perturbations resulting from overhead.

SUMMARY OF THE INVENTION

The present invention provides a method, a system, and an apparatus for restricting resources consumed by ghost agents. The ghost agent can be a self-governing software object that can be associated with a host. The ghost agent can monitor the host actions and perform operations relating to the host. When the host moves within a grid environment, the ghost agent can move to follow the host. In order to restrict computing resources, a resource utilization value can be determined, where the resource utilization value can be calculated from multiple different resource types, such as CPU cycles, storage space, network input/output capacity, and the like. If the resource utilization value exceeds a usage threshold, the ghost agent can be deactivated for a predetermined period. A deactivated ghost agent does not perform ghost operations. Deactivating the ghost agent when resource utilization is high, can prevent the ghost agent from consuming scarce computing resources at times when those resources are needed for operational activities, such as executing host actions within the grid environment.

One aspect of the present invention can include a method for restricting resources consumed by ghost agents. The method can include the step of associating a ghost agent with a host. A resource utilization value can be ascertained for the ghost agent and the host combined. For example, the resource utilization value can be the sum of the utilization of the host plus the utilization of the ghost agent. In one embodiment, a first value specifying a usage of a first resource type and a second value specifying a usage of a second resource type can be determined. The resource utilization value can be calculated based on the first value and the second value. The ascertained resource utilization value can be compared with a usage threshold. Once the resource utilization value has been ascertained, a determination can be made as to whether at least one operation of the ghost agent is to be executed based upon the previous comparison.

In one embodiment, an idle timer can be established. If it is determined that the ghost operations are not to be executed, then the idle timer can be started and the ghost agent can be deactivated. A deactivated ghost agent does not execute operations. When the idle timer exceeds a designated time threshold, the ghost agent can be activated. In another embodiment, a first operation that requires a first quantity of computer resources can be identified. Additionally, a second operation that requires a second quantity of computing resources can be identified. In such an embodiment, the second operation can be performed by the ghost agent in place of the first operation. A selection can be made between the first operation and the second operation based upon the results of the previous comparison.

In another embodiment, an operation queue can be established for the ghost agent. The determination concerning whether operations are to be executed can be made with respect to operations included within the operation queue. If the previous determination indicates that one or more operations are to be executed, the operations can be executed according to a priority established by the operations queue. However, if the previous determination indicates that operations are not to be executed, one or more operations can be added to the operation queue to be executed during periods in which the ghost agent is activated.

Another aspect of the present can include a ghost agent including an interface, a ghost log, an operation queue, a ghost controller, and/or a ghost identifier. The ghost agent can automatically move within a grid environment to follow movements of an associated host. The interface can associate or bind the ghost agent with the host. The ghost log can record data relating to the host. The operation queue can queue operations for execution by the ghost agent as well as establish a prioritization order for the operations. The ghost controller can manage interactions between the ghost agent and a grid environment. The ghost identifier can identify the ghost agent to components within the grid environment. A means for restricting resources consumed by the ghost agent can be provided. This restriction means can be initialized by the ghost agent and integrated within the run-time behavior of the ghost agent. Further a means for disassociating the ghost agent from the host and a means for associating the ghost agent with a different host can be provided.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention includes a method, a system, and an apparatus for constraining the resources that ghost agents consume. Ghost agents can be self-managing, self-identifying software objects configured to associate themselves with hosts, where a host can be a software object. Any suitable technique can be used to attach the ghost agent to the host including, but not limited to, debugging attachment techniques, system calibration techniques, hardware performance testing techniques, and similar binding methodologies. Ghost agents can replicate the actions of the associated hosts and perform operations on the replicated actions. In one embodiment, ghost agents can record actions performed by the hosts to generate a log of host activities. Additionally, the ghost agents can determine the time required to execute host actions, the resources consumed in executing host actions, and/or the load upon system components while executing host actions.

Figure 1:
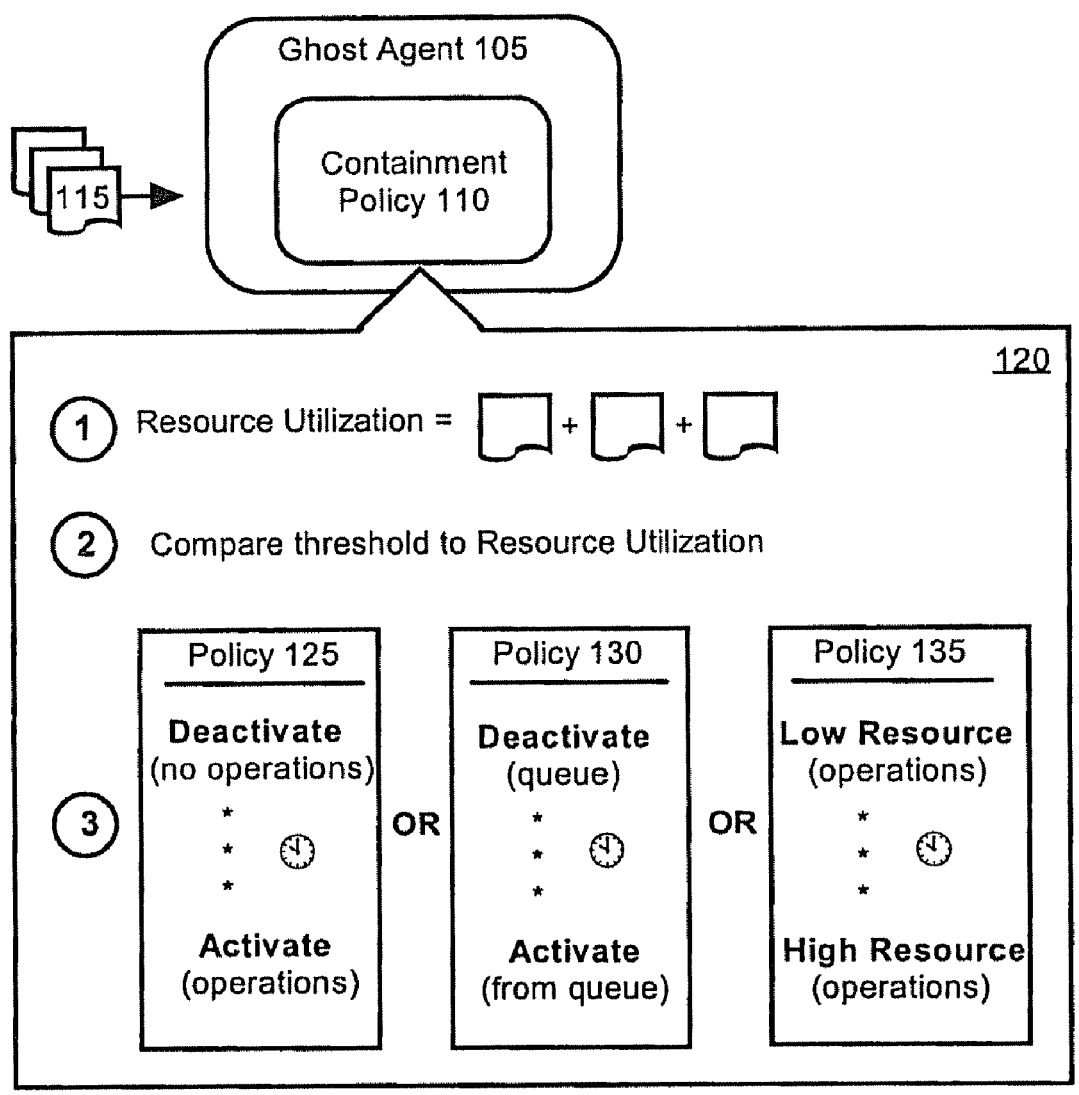
FIG. 1 is a schematic diagram of a ghost agent including a containment policy that restricts the resources that ghost agent can consume in accordance with the inventive arrangements disclosed herein.

FIG. 1 is a schematic diagram of a ghost agent 105 including a containment policy 110 that restricts the resources that ghost agent 105 can consume in accordance with the inventive arrangements disclosed herein. The containment policy 110 can establish resource usage limitations. When these limitations are exceeded, the resource consumption of the ghost agent 105 can be reduced in a manner specified within the containment policy 110. The resource usage limitations can be compared to values calculated from one or more resource usage messages 115. The record usage messages 115 can be generated by resource providing grid components and/or by grid monitoring elements. Record usage messages 115 can specify a utilization of at least one computing resource, such as CPU cycles, storage space, and network capacity. It should be noted that any of a variety of different computing resources can be specified within the resource usage messages 115 and that the invention is not limited in this regard.

For example, computing resources consumed by the ghost agent 105 can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software computing resources can include algorithms and heuristics such as database search routines, spell-checking routines, transcription services, text-to-speech services, format conversions, Web services, and the like.

Exploded section 120 illustrates a few exemplary methods in which the containment policy 110 can constrain the resources used by the ghost agent 105. In exploded section 120, the first step in constraining resources involves calculating a resource utilization value. The resource utilization value can be calculated based upon the resource usage messages 115. For example, the resource utilization value can be the summation of multiple resource usages specified by within the resource usage messages 115. In a different example, the resource utilization can be equal to the greatest usage value obtained from the usage messages 115. Alternately, the resource utilization can be an average, mean, median, and the like calculated from the usage values. In still another example, each usage value can be multiplied by an established weight. The resource utilization can be the sum of the weighted usage values.

Once the resource utilization is determined in first step, a second step can be performed, where the resource utilization can be compared to a defined threshold or limitation. The defined threshold can be based on the quantity of resources consumed by the ghost agent 105 as well as resources consumed by the ghost agent 105 and/or the quantity of resources consumed by software objects associated with the ghost agent 105. If the resource utilization exceeds the usage threshold, a third step can be performed. The third step can reduce the quantity of resources that are consumed by the ghost agent 105. Reduction methods used in the third step can include methods specified in policies 125, 130, and 135.

In policy 125, the ghost agent 105 can be deactivated so that the ghost agent 105 is not able to execute operations. Attempted operations during this deactivation period can be discarded. After a designated time specified within the containment policy 10, the ghost agent 105 can be reactivated. When activated, the ghost agent 105 can once again execute attempted operations.

In policy 130, the ghost agent 105 can also be deactivated so that the ghost agent 105 is not able to execute operations. In policy 130, however, attempted operations during this deactivation period are queued. After a designated time specified within the containment policy 110, the ghost agent 105 can be activated. Once activated, the ghost agent 105 can execute operations from the queue, according to a priority order established by the queue. Accordingly, when policy 130 is implemented, operations attempted during the deactivation period are not discarded, but are instead delayed.

In policy 135, the ghost agent 105 can be restricted to the execution of operations that consume a low quantity of resources. Accordingly, some manner of specifying whether an attempted operation consumes a high or a low quantity of resources must be available. For example, a lookup table can be accessible that categorizes ghost resources into a low resource consumption or a high resource consumption category. In another example, the procedures and functions of the ghost agent 105 can self-specify whether a high or low quantity of resources is required. The restriction allowing only operations having low resource requirements to be executed can persist for a designated time period, after which operations that consume a high quantity of resources can be executed. It should be appreciated that the containment policy 110 is not limited to policy 125, policy 130, and/or policy 135, and that any of a variety of policies can be utilized herein.

Figure 2:
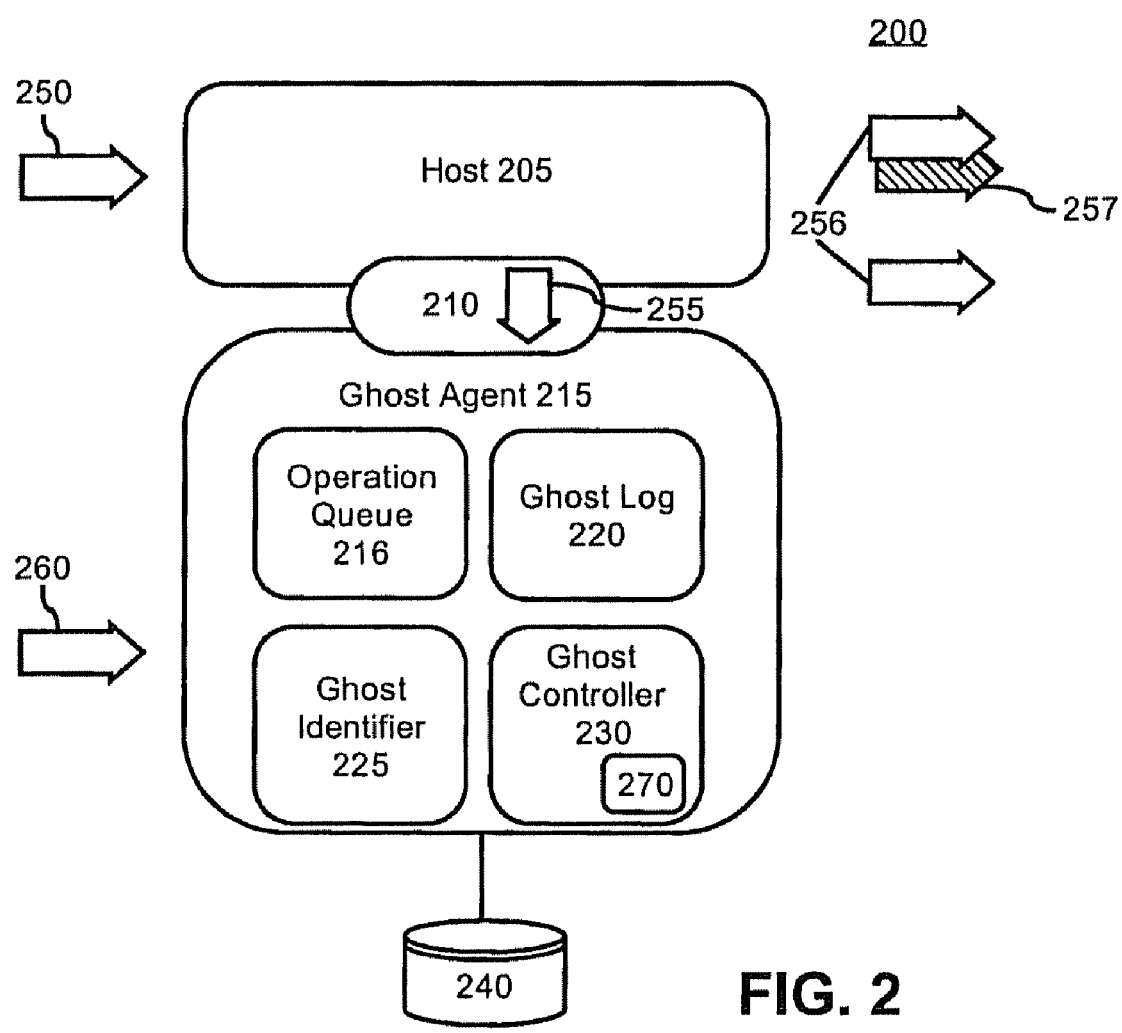
FIG. 2 is a schematic diagram illustrating a host and a ghost agent within a grid environment in accordance with the inventive arrangements disclosed herein.

FIG. 2 is a schematic diagram illustrating a host 205 and a ghost agent 215 within a grid environment 200 in accordance with the inventive arrangements disclosed herein. The grid environment 200 can be a distributed computing environment that includes a multitude of hardware and software components that provide computing resources. The computing resources of the grid environment 200 can be accessible on an as needed basis to a multitude of applications, users, and organizations. The grid environment 200 can include any hardware platform, operating system, storage scheme, and/or software resource that adhere to the standards and protocols defined for the grid environment 200.

The host 205 can be any definable software unit within the grid environment 200 that can receive input 250 and execute actions 256. The input 250 can include messages of any type conveyed to the host 205, such as keyboard input, procedural calls, and the like. The actions 256 can be relatively high-level actions as well as low-level actions. High-level actions can include calls to software routines that can contain one or more external procedural calls. Low-level actions can include hardware device calls and the execution of one or more processes or threads.

The ghost agent 215 can be associated or bound to the host 205 though the ghost interface 210. The ghost interface 210 can generate replicated actions 255 that are copies of the actions executed by the host 205, using any of a variety of suitable techniques. For example, techniques used by software debugging programs can attach monitors to running programs in order to evaluate system behavior and step through code. Alternatively, techniques used by system calibration and hardware performance testing utilities can be used by the ghost interface 210 to bind the ghost agent 215 with the host 205. Further, operating system level commands, tools, and functions analogous or similar to the UNIX commands "strace" and "ptrace," can potentially be used by the ghost interface 210 to bind the host 205 with the ghost agent 215. Strace is a commonly used system call trace, i.e. a debugging tool that prints out a trace of all the system calls made by another process and/or program. Additionally, ptrace is a commonly used system call that enables one process to control the execution of another. Ptrace also enables a process to change the core image of another process.

In one embodiment, the ghost interface 210 can be implemented as one or more Java software objects. In such an embodiment, the ghost interface 210 can cause a Java Web server to be initialized with the Java debugging command, "java_g." The ghost interface 210 can utilize a Java debugging object to replicate the actions of the host 205 and convey the replicated actions 255 to the ghost agent 215. Additionally, passwords provided by the host 205 can be echoed to the ghost interface 210 and used to authorize the ghost agent 215 as appropriate.

In another embodiment that functions within a Java environment, both the host 205 and the ghost agent 215 can be implemented as different Java classes such that the ghost interface 210 can appropriately convey messages between the host 205 and ghost agent 215 classes. In yet another embodiment, the ghost interface 210 can be implemented using a Java/Tcl blend, where Tcl is a computing language that interoperates with Java code segments. In that embodiment, the ghost interface 210 can use the "java::bind" command to generate callback scripts from events in the host 205. The call back scripts can replicate actions for the ghost agent 215.

The embodiments of the ghost interface 210 disclosed herein are not restricted to the Java programming language as one of ordinary skill in the art can utilize any of a variety of programming languages and techniques. For example, the ghost interface 210 can be implemented using a GNU debugger distributed by the Free Software Foundation and an Apache server distributed by the Apache Software Foundation. The GNU debugger can be attached to an Apache server causing all activity occurring within the server to be directed to the GNU debugger. The host 205 can be disposed within the Apache server so that the ghost agent 215 can utilize replicated actions of the host 205 provided by the GNU debugger.

Regardless of how the ghost interface 210 is implemented, the ghost agent 215 can manipulate the replicated actions 255 when performing ghost operations. The replicated actions 255 can be passive or "read only" actions that have no operational effect upon the grid environment 200 other than, perhaps, consuming a portion of the computing resources of the grid environment 200. Accordingly, in particular embodiments, the passive actions can be stored within the ghost agent, yet not be broadcasted into the grid environment 200. For example, a passive action can involve analyzing a replicated action to determine performance metrics, resource utilization metrics, and/or estimated load metrics relating to the replicated action. The ghost agent 215 can also generate one or more active actions 257 that are executed within the grid environment 200.

The ghost agent 215 can include an operation queue 216, a ghost log 220, a ghost identifier 225, and a ghost controller 230. The operation queue 216 can establish an order in which ghost operations are to be performed using any of a variety of known queuing algorithms. For example, the operation queue 216 can be a simple first-in-first-out (FIFO) queue. In another example, the operation queue 216 can establish an execution order based upon operation-specific priority values. In yet another example, the operation queue 216 can prioritize operations according to the resources required to execute the respective operations. The operation queue 216 can also establish a weighted prioritization scheme that balances available computing resources, the computing resources required for individual operations, and established operation preference values.

The ghost log 220 can record the data relating to the replicated actions 255, such as debugging actions, validation actions, and testing actions, thereby creating a log. The ghost log 220 can also receive and record resource usage data from one or more sources so that the ghost agent 215 can responsively determine resource usage values. For example, the ghost log 220 can receive a system message specifying the amount of storage memory space consumed by the ghost agent 215. The ghost agent 215 can responsively determine a resource usage value signifying a level of the storage space consumed. This resource usage value can be temporarily stored in the ghost log 220. The ghost agent 215 can periodically retrieve resource usage values as necessary from the ghost log 220 to calculate the resource utilization value, which is used to restrict the resources consumed by the ghost agent 215.

The ghost log 220 can be configured to record all activities relating to the associated host 205 or can be configured to record only selected activities. For example, the ghost log 220 can record a statistically relevant portion of actions, such as recording data relating to every $n^{th}$ replicated action 255 or every $n^{th}$ validation comparison. The ghost log 220 can also capture system information and add annotations from this system information to the generated log.

For example, system clock information can be captured and used to annotate the time between receiving a replicated action 255 and the completion time for an associated active action 257. Operational metrics, including load metrics, for the replicated action can be gathered in this fashion. In another example, metadata information contained within message flows, such as input 250, and active action 257, can be recorded and/or utilized by the ghost log 220. Additionally, the ghost log 220 can time stamp data relating to replicated actions 255.

The ghost log 220 can also record the log information in a ghost log repository 240. The ghost log repository 240 can be a temporary buffer or a persistent data storage area. If the ghost log repository 240 is external to the ghost agent 215, any of a variety of different mechanisms can be utilized to convey the log data to the ghost log repository 240.

For example, an intermittent communication link, such as a unicast or a point-to-point communication link can be established between the ghost log 220 and the ghost log repository 240 through which data can be conveyed. In another example, a buffer space, which can be another embodiment of ghost log 220, within the ghost agent 215 can record log information. Whenever the buffer reaches a specified volume of data, a message containing the buffered information can be conveyed to the ghost log repository 240. The buffer within the ghost agent 215 can then be cleared and used to store fresh data.

In yet another example, ghost agents 215 can convey log data to a local data server. The local data server can then convey all received log data to the ghost log repository 240 from time to time or on a periodic basis. In still another example, the ghost agent 215 can intermittently deposit log data to a local location. Then a data-reaping object can gather packets of the log data that have been locally deposited by the various ghost agents 215. The packets of log data can be conveyed to the ghost log repository 240 by the data-reaping objects.

The ghost identifier 225 can provide identification, authorization, and security related functions for the ghost agent 215. That is, the ghost identifier 225 can identify the ghost agent 215 to the various components of the grid environment 200. Accordingly, servers in the grid environment 200 can have an awareness of the ghost agent 215. The grid servers can then use policy-based controls to manage permissions, authentication, resource utilization, and security for the ghost agents 215. Ghost agents 215 adhering to the established policies can be permitted to automatically enter and exit the various grids of the grid environment 200.

The ghost agent 215 can be granted different access privileges to computing resources as the ghost agent 215 traverses from one grid in a grid environment 200 to another depending on grid-based policies. Privileges afforded the ghost agent 215 can be determined in any manner known in the art. For example, a ghost agent 215 can replicate the passwords provided by the host 205 and use the replicated passwords to provide authentication to the grid environment 200. In another example, before a ghost agent 215 can be permitted to follow an associated host 205 from one grid in the grid environment 200 to the next, a password or digital certificate unique to the ghost agent 215 can be required. The ghost agent 215 can receive the same system privilege level within the grid environment 200 as the host 205 or can receive a different privilege level.

The ghost controller 230 can manage the ghost agent 215. For example, the ghost controller 230 can establish a life span for a particular ghost agent 215 so that the ghost agent 215 self-terminates after a designated period. The ghost controller 230 can also limit the operations that can be performed by the ghost agent 215 based upon an included containment policy 270. For example, the ghost controller can calculate resource utilization values, compare these values to thresholds, and can responsively activate and/or deactivate the ghost agent 215.

In one embodiment, the ghost controller 230 can accept control signals 260 from an external source. Further, the ghost controller 230 can include a listener object capable of responding to particular events broadcasted by a corresponding notifier object. For example, a received broadcast can cause the ghost controller 230 to alter the containment policy 270. Such broadcasts can be common within frameworks that include ghost-regulating components.

While ghost log repository 240 is depicted as being external and possibly remotely located from the ghost agent 215, it should be appreciated that the ghost log repository 240 can also be an allocated memory space internal to the ghost agent 215. For example, the ghost log repository 240 can be a dynamically allocated segment of random access memory (RAM) available to the ghost agent 215 as needed.

It should be noted that there are many possible ways to implement the elements of system 200. Implementation details can depend upon the conditions of the host 205, the specifics of the ghost agent 215, and details concerning the grid environment 200. One of ordinary skill in the art can apply the teachings disclosed herein to a variety of different conditions using well-known software engineering techniques and principles.

Figure 3:
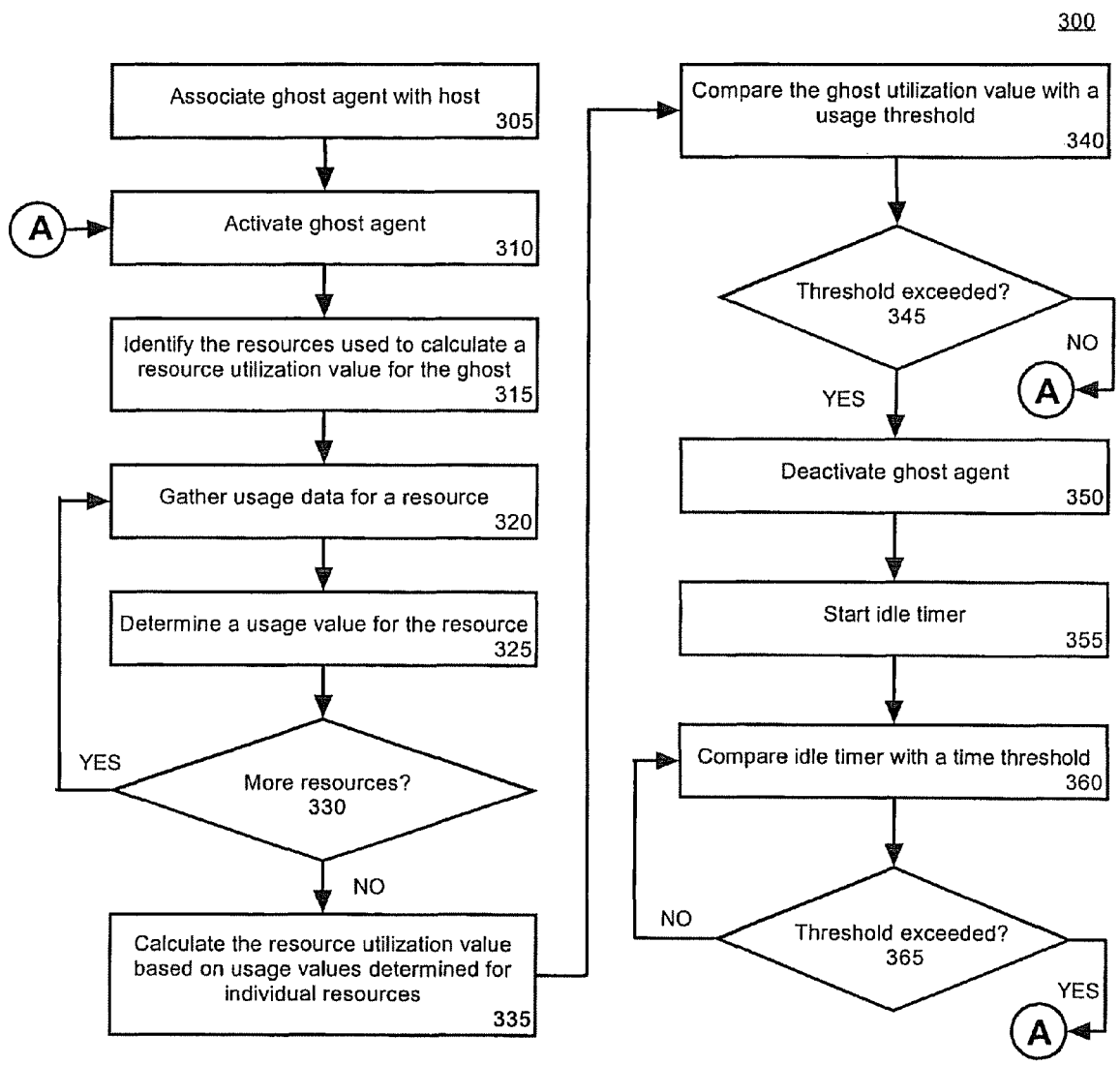
FIG. 3 is a flowchart illustrating a method for restricting resources consumed by ghost agents in accordance with the inventive arrangements disclosed herein.

FIG. 3 is a flowchart illustrating a method 300 for restricting resources consumed by ghost agents in accordance with the inventive arrangements disclosed herein. The method 300 can be performed in the context of a grid environment that includes ghost agents. The method 300 can begin in step 305, where a ghost agent can be associated with a host. In step 310, the ghost agent can be activated so that it can execute one or more ghost operations. In step 315, a plurality of resources used to calculate a resource utilization value can be identified. Resources can include any computing resource that the ghost agent can use.

In step 320, usage data can be gathered for one of the resources. For example, the ghost agent can query a storage device to determine available usage space within the storage device. In step 325, a usage value can be determined for the resource based on the gathered usage data. In step 330, if there are more resources involved in the calculation of the resource utilization value, the method can proceed to step 320, where usage data for the next resource can be gathered. If, on the other hand, no more resources exist as determined by step 330, the method can proceed to step 335.

In step 335, the resource utilization value can be calculated based on the usage values determined for the individual resources. In step 340, the calculated resource utilization value can be compared with a usage threshold. In step 345, if the usage threshold is not exceeded, the method can proceed to step 310, where the ghost agent can remain active and continue self-monitoring. In step 345, if the usage threshold is exceeded, the method can proceed to step 350, where the ghost agent can be deactivated. In step 355, an idle timer can be started. In step 360, the current time for the idle timer can be compared with a time threshold. In step 365, if the time threshold is not exceeded, the method can loop through step 360 until the threshold is exceeded. The ghost agent remains deactivated during this period until the time threshold is exceeded. When the time threshold is exceeded in step 365, the method can proceed to step 310, where the ghost agent can be activated.

It should be noted that particular embodiments of method 300 can include an operation queue. In such embodiments, when the ghost agent is deactivated and unable to execute operations, the operations can be placed within the queue to be executed later. The operation queue can also be used to prioritize the execution of operations when the ghost agent is activated.

Figure 4:
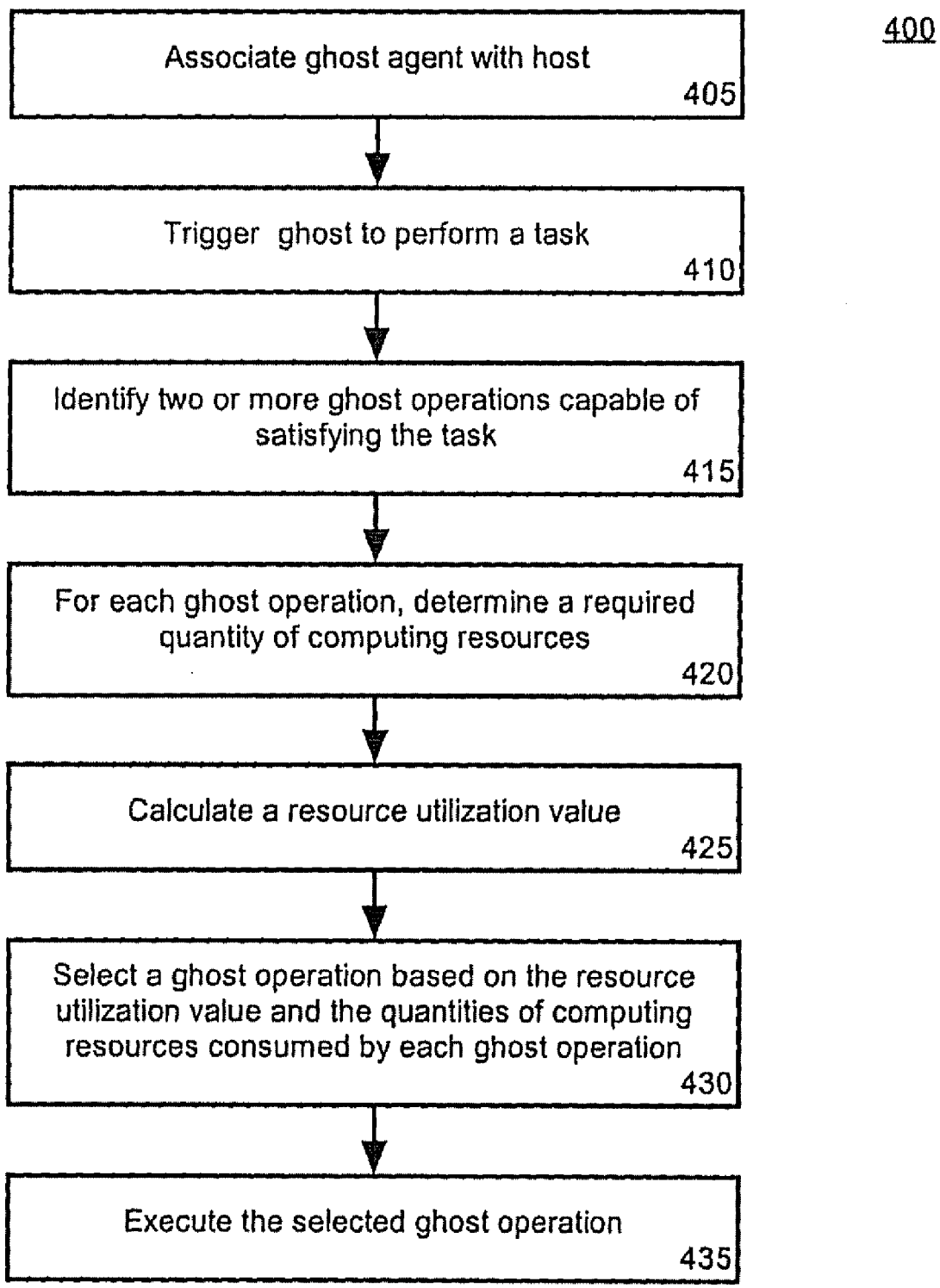
FIG. 4 is a flow chart of a method for restricting resources consumed by a ghost agent in accordance with the inventive arrangements disclosed herein.

FIG. 4 is a flow chart of a method 400 for restricting resources consumed by a ghost agent in accordance with the inventive arrangements disclosed herein. The method 400 can be performed in the context of a grid environment including one or more ghost agents. The method 400 can begin in step 405, where a ghost agent can be associated with a host. In step 410, the ghost agent can attempt to execute a task. The task can involve the execution of at least one ghost operation. In step 415, two or more ghost operations that are capable of satisfying the task can be identified. For example, a first test method and a second test method that can be used in place of the first test method can be identified. In step 420, for each identified ghost operation, the quantity of computing resources required to perform the operation can be identified. For example, a searchable table can categorize operations as consuming a high quantity of computing resources or a low quantity of computing resources.

In step 425, a resource utilization value for the ghost agent can be calculated as previously described herein. In step 430, one of the ghost operations identified in step 415 can be selected. The selection can be based upon the resource utilization value and the quantities of computing resources consumed for each potential operation. For example, a high resource utilization value can cause a restriction to be imposed upon the ghost agent, wherein the ghost agent is only permitted to execute low resource consuming operations. A low resource utilization value, on the other hand, can permit the ghost agent to execute high resource consuming operations and can permit the ghost agent to execute low resource consuming operations. In step 435, the operation selected in step 430 can be executed.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for restricting resources consumed by ghost agents within a grid computing environment, comprising:

at least one processor; and a computer-readable medium having stored thereon instructions for causing the at least one processor to perform the steps of:

identifying a host, wherein said host is a software object operating within said grid environment and movable from one grid to another grid within the grid environment;

associating a ghost agent with the host, wherein said ghost agent is configured to execute at least one operation, the at least one operation comprising replicating and recording at least one action of said host, and wherein the ghost agent follows the movement of the host;

identifying computing resources used by the ghost agent;

determining usage values for computing resources used by the ghost agent;

ascertaining a resource utilization for said ghost agent based the usage values for the computing resources;

comparing said resource utilization to a usage threshold value pre-established for the ghost agent, wherein the usage threshold value defines a maximum resource utilization value permitted; and reducing a quantity of the computing resources used by the ghost agent if it is determined that the resource utilization value exceeds the usage threshold value, wherein the ghost agent can be deactivated and reactivated, and wherein the step of reducing further comprises queuing attempted operations of the ghost agent during deactivation and executing operations from the queue after the ghost agent is reactivated.

2. The system of claim 1, further comprising instructions for causing the at least one processor to prevent said ghost agent from executing at least one operation based upon said comparison.

3. The system of claim 1, the computer-readable medium further comprising instructions for causing the at least one processor to identify said ghost agent to components within said grid environment.

4. The system of claim 1, the computer-readable medium further comprising instructions for causing the at least one processor:
- disassociating said ghost agent from said host; and
- associating said ghost agent with a different host.

5. A non-transitory computer-readable medium having stored thereon, a computer program having a plurality of code sections, said code sections executable by a machine for causing the machine to perform the steps of:
- associating a ghost agent with the host, wherein said ghost agent is configured to execute at least one operation, the at least one operation comprising replicating and recording at least one action of said host, and wherein the ghost agent follows the movement of the host;
- identifying computing resources used by the ghost agent;
- determining usage values for computing resources used by the ghost agent;
- ascertaining a resource utilization for said ghost agent based the usage values for the computing resources;
- comparing said resource utilization to a usage threshold value pre-established for the ghost agent, wherein the usage threshold value defines a maximum resource utilization value permitted; and
- reducing a quantity of the computing resources used by the ghost agent if it is determined that the resource utilization value exceeds the usage threshold value,
- wherein the ghost agent can be deactivated and reactivated, and wherein the step of reducing further comprises queuing attempted operations of the ghost agent during deactivation and executing operations from the queue after the ghost agent is reactivated.

6. The computer-readable medium of claim 5, wherein said ascertaining step further comprises the steps of:
- determining a first value specifying a usage of a first resource type;
- determining a second value specifying a usage of a second resource type; and
- calculating said resource utilization based on said first value and said second value.

7. The computer-readable medium of claim 5, further comprising the steps of:
- deactivating said ghost agent according to said comparing step;
- starting an idle timer; and,
- activating said ghost agent when said idle timer reaches a predetermined time.

8. The computer-readable medium of claim 7, further comprising the step of:
- storing at least one operation in an operation queue when said ghost agent is deactivated.

9. The computer-readable medium of claim 8, further comprising the step of:
- executing said stored operation when said ghost agent is activated.

10. The computer-readable medium of claim 8, wherein said operation queue is disposed within said ghost agent.

11. The computer-readable medium of claim 5, further comprising the steps of:
- identifying a first operation that requires a first quantity of computing resources; and
- identifying a second operation that requires a second quantity of computing resources,
- wherein said second operation can be performed by said ghost agent in place of said first operation, and wherein said determining step selects between said first operation and said second operation based upon said comparing step.

* * * * *